2,713,580

ORGANOTIN TRIMERCAPTIDES OF 2-MERCAPTO-THIAZOLE AND DERIVATIVES THEREOF

Eugene P. Stefl, Churchill Valley, Pa., and Chris E. Best, Franklin Township, Summit County, Ohio, assignors to The Firestone Tire & Rubber Company, Akron, Ohio, a corporation of Ohio No Drawing. Application September 6, 1951, Serial No. 245,418

6 Claims. (Cl. 260—299)

This invention relates to novel compounds having the formula (I) 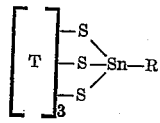

wherein T represents a 2-thiazolyl-type radical such as 2-(benzothiazolyl), 2-(thiazolinyl), 2-(thiazolyl), 2-(tetrahydrobenzothiazolyl), 2-(o-phenyl-benzothiazolyl), 2-(4-methyl-thiazolyl,) 2-(4,5 - dimethyl - thiazolyl), 2-(4-ethyl-thiazolyl) and 2-(naphthothiazolyl); R represents a hydrocarbon radical containing from 1 to 22 carbon atoms.

The compounds may conveniently be prepared by reacting 2-mercaptothiazole derivatives of the formula (II)  T—S—H with organostannic acids of the formula

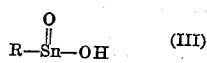 (III)

all under the notation given above in connection with Formula I. Water is eliminated, with formation of the desired Compounds I.

THE SUBSTITUENT R

The group R in the above formulae may be substantially any substituent which (a) is not too large for convenient synthesis and reactivity and (b) does not contain any groups which will interfere with the synthesis or existence of the compound. It will be understood, of course, that the atom in the group R attached to the tin atoms must be a carbon atom. In practice, a range of from 1 to 22 carbon atoms in the radical R will cover the field of radicals which will be conveniently available and which will not be too large to be readily reactable in the synthesis of the compounds of this invention. The radical may be, and from the standpoint of ready procurement and avoidance of complications in synthesis preferably is, a simple monovalent hydrocarbon radical containing only single bonds or aromatic ring double bonds between the carbon atoms, for instance an alkyl, cycloalkyl, aryl, aralkyl, alkaryl and like monovalent hydrocarbon radical containing from 1 to 22 carbon atoms. Likewise, this radical, in addition to simple hydrocarbon structures, may contain various other groupings which are sufficiently low in number, and of sufficiently non-reactive character, as not to interfere with the synthesis of the compounds of this invention. Structures which have been found innocuous and non-interfering are inter alia, aliphatic ethylenic linkages (as distinguished from the unsaturated bonds in aromatic rings, which may be present in numbers limited only by the size of the radical R in question i. e., from 3 to 11 such double bonds) acetylenic linkages, ether linkages, thioether linkages, carboxylic ester linkages, fluorine atoms bonded to carbon atoms, and halogen atoms bonded to aromatic ring carbon atoms. Of all the radicals coming within the ambit of R as above defined, the simple hydrocarbon radicals containing a total of not more than four non-aromatic ethylenic linkages and acetylenic linkages will be preferred, as the starting materials for these compounds will be most readily accessible, and less complications will be encountered in the synthetic steps leading to the compounds of this invention.

The radical R is brought into the compound of this invention with the organostannic acid (III). Suitable specific organostannic acids for this purpose include inter alia:

Table I

| | |
|---|---|
| n-Butylstannic acid | Hexadecylstannic acid |
| Isobutylstannic acid | Phenylstannic acid |
| n-Hexylstannic acid | (2-thienyl)stannic acid |
| 2-ethylhexylstannic acid | Furylstannic acid |
| Laurylstannic acid | Xenylstannic acid |
| Mixed alkylstannic acids containing alkyl groups derived from cocoanut oil | Ethoxyethylstannic acid |

THE RADICAL T

As above noted, these radicals may be any of various thiazolyl-type radicals and are brought into the compounds of this invention as constituents of the mercaptothiazole derivative of Formula II which will be seen to be a class of mercaptans produced by oxidative or disproportionative condensation between carbon disulfide and various amines. Representative 2-mercaptothiazole derivatives are, inter alia,

Table II

| | |
|---|---|
| 2-mercaptobenzothiazole | 4 - methyl - 2 - mercaptothiazole |
| 2-mercaptothiazolene | |
| 2-mercaptothiazole | 4,5 - dimethyl-2-mercaptothiazole |
| Tetrahydro - 2 - mercaptobenzothiazole | |
| (o - Phenyl) 2 - mercaptothiazole | 4-ethyl-2-mercaptothiazole |
| | 2 - mercaptonaphthothiazole |

THE SYNTHESIS OF THE COMPOUND OF THIS INVENTION

The compounds of this invention may conveniently be prepared via the reaction:

(1)

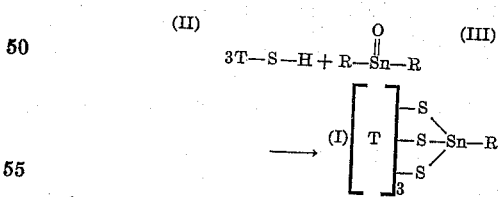

under the notation given above. The reaction may be carried out by simply fusing the reactants (II) and (III) together, with heating at temperatures in the range 80–200° C., it being understood that the temperature must be high enough to fuse the reactants involved, and to evaporate the water at the prevailing pressure (subatmospheric if the temperature is below 100° C.). Alternatively, the reaction may be carried out in the presence of a liquid medium, which may be a solvent for one or both of the reactants. Hydrocarbon solvents such as benzene, toluene and the like are well adapted for this purpose, since they boil in a range at which they may conveniently be refluxed to entrain and remove the water produced in the reaction. Likewise, the final product (I) is generally soluble in these solvents, whereas usually the mercaptothiazole derivative (II) and organostannic acid (III) are insoluble, so that the final reaction mixture can be freed of unreacted material by filtration. The reaction is substantially quantitative, so that no great excess of either reactant (II) or (III) need be employed.

The compounds of this invention may also be prepared by the reaction (2)

(IV)  $3T-S-alk + Cl_3SnR$

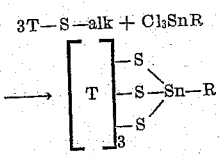

wherein "alk" represents an alkali metal such as sodium or potassium, and the remainder of the notation is as given for Formula I hereinabove. The reaction may be carried out by mixing the reactants together, if desired in the presence of an inert liquid reaction medium. The product (I) may readily be isolated by filtering off the insoluble alkali metal halides.

PROPERTIES AND USES OF THE COMPOUNDS OF THIS INVENTION

The mercaptides of this invention, particularly when prepared from reactants containing only single species of compounds coming under formulae II, III, IV and V above, are crystalline compounds commonly melting at temperatures in the range 100–220° C. When prepared from mixed compounds, e. g. those in which R, represents mixed radicals obtained from natural fatty glyceride oils or from petroleum fractions, the products naturally have no sharp melting point. Such preparations nevertheless come within the ambit of this invention, providing that they contain mixtures of compounds individually answering Formula I above. The compounds of this invention are useful, inter alia, as stabilizers in organic materials, and particularly as heat stabilizers in resins based upon vinyl chloride.

With the foregoing general discussion in mind, there are given herewith detailed examples of the practice of this invention. All parts given are on the basis of weight.

EXAMPLE I

A. Preparation of mercaptide

| | | |
|---|---|---|
| Organostannic acid | gram-moles | .017 |
| Mercaptothiazole derivative | do | .050 |
| Toluene | ml | 100 |

A series of mercaptides was prepared by reacting various organostannic acids with various mercaptothiazole derivatives as indicated in Table I. In each case the selected organostannic acid, selected mercaptothiazole derivative, and toluene, in the proportions indicated in the above recipe, were refluxed at atmospheric pressure for three hours under a condenser provided with a water-trap so as to divert the refluxed water while returning the toluene to the reaction mixture. The reaction mixture was then cooled to room temperature, filtered to remove any insoluble material, and then heated to strip off the toluene. The residue was taken as being a substantially pure organotin trimercaptide of the mercaptothiazole derivative.

B. Testing in vinyl chloride resin

| | Parts |
|---|---|
| Vinyl chloride resin (copolymer of 97% vinyl chloride, 3% vinylidene chloride) | 100 |
| Di(2-ethylhexyl)phthalate | 46 |
| Tricalcium phosphate | 1 |
| Silicate pigment | 1 |
| Stabilizer compound under test | 2 |

A series of compositions was made up in accordance with the foregoing schedule, using as the stabilizer each of the organotin dimercaptides prepared as above described and tabulated below. In each case the listed ingredients, together with the compound under test, in the proportion listed in the schedule were thoroughly mixed together and placed on a laboratory roll mill at 320° F. Milling was continued for two minutes, at the end of which time the gauge was set at 0.025 inch and the sheet removed from the mill and cooled.

Five one-inch square specimens of each of the compositions prepared as above described were hung vertically in a forced-draft oven maintained at 170° C. Specimens of each of the compositions were removed at intervals of 15, 30, 60, 90 and 120 minutes of exposure in the oven, and were rated subjectively as to color and extent of deterioration by the operator, which ratings are set forth herewith in Table III opposite the tabulation of the preparation of the compound under test. By way of contrast, a composition in accordance with the above formula, but omitting any stabilizer, showed marked deterioration after as short a time as 15 minutes in the oven, see the last item in the table.

Table III

| Constitution of Mercaptide Product | | Properties of Product | Amt. of Mercaptide Used (parts by weight) | Vinyl Resin Stability Test Color of Test Specimen After Exposure In Oven For— | | | | | Run No. |
|---|---|---|---|---|---|---|---|---|---|
| Group Attached To Tin in Organostannic Acid | Mercaptothiazole Derivative Used | | | 15 min. | 30 min. | 60 min. | 90 min. | 120 min. | |
| Butyl | 2-Mercaptobenzothiazole. | light-orange viscous liquid. | 2 | faint straw | light straw | straw | tan | light brown | 1 |
| "Lorol"[1] | do | viscous liquid $n_D^{20}$ 1.5973. | 2 | off white | pale straw | do | do | do | 2 |
| Blank—no stabilizer | | | 0 | tan | dark tan | brown | dark brown | dark brown | 3 |

[1] The mixed alkyl groups derived from cocoanut oil fatty acids.

From the foregoing general description and detailed specific examples, it will be evident that this invention provides novel mercaptide compounds useful, inter alia, as stabilizers in vinyl chloride resins. The compounds are based upon the cheaply and readily available 2-mercaptothiazole derivatives and organostannic acids, and are arrived at by way of relatively single syntheses.

What is claimed is:

1. A compound of the formula

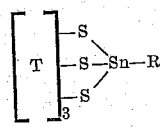

wherein R represents a hydrocarbon radical containing from 1 to 22 carbon atoms and T represents a radical selected from the group consisting of 2-(benzothiazolyl), 2-(thiazolinyl), 2-(thiazolyl), 2-(tetrahydrobenzothiazolyl), 2-(o-phenyl-benzothiazolyl), 2-(4-methyl-thiazolyl), 2-(4,5-dimethyl-thiazolyl), 2-(4-ethylthiazolyl) and 2-(naphthothiazolyl).

2. A compound of the formula

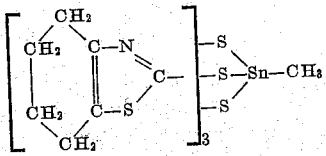

3. A compound of the formula

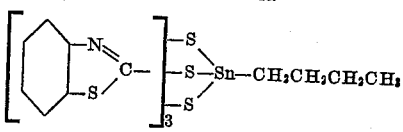

4. A compound of the formula

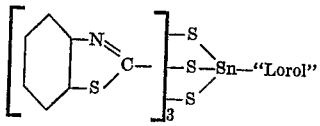

5. A compound of the formula

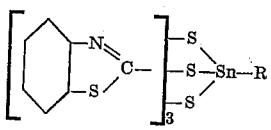

wherein R represents a hydrocarbon radical containing from 1 to 22 carbon atoms.

6. A compound of the formula

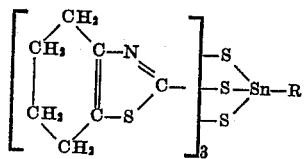

wherein R represents a hydrocarbon radical containing from 1 to 22 carbon atoms.

References Cited in the file of this patent

UNITED STATES PATENTS

| | | |
|---|---|---|
| 1,838,159 | Scott | Dec. 29, 1931 |
| 2,426,586 | Beber | Sept. 2, 1947 |

OTHER REFERENCES

Sebrell et al.: Ind. Eng. Chem., 15, 1009–14 (1923).
Spacu et al.: C. A., vol. 29 (1935), C₁ 7213–4.
Shobayashi: J. Soc. Rubber Ind. Japan 16, 32–40 (1943).
Cleverdon et al.: C. A., vol. 44 (1950), C₁ 4718.
Miyama: J. Soc. Rubber Ind. Japan 17, 34–8 (1944).